July 30, 1963 H. J. MORGAN 3,099,307

MEAT SCORING AND TRIMMING KNIFE

Filed March 2, 1961

INVENTOR
Hillen J. Morgan

BY Mason, Fenwick & Lawrence
ATTORNEYS

3,099,307
MEAT SCORING AND TRIMMING KNIFE
Hillen J. Morgan, La Plata, Md.
Filed Mar. 2, 1961, Ser. No. 92,848
2 Claims. (Cl. 146—203)

This invention relates to cutlery generally, and particularly to knives specially designed to trim and score meats, such as hams.

It is customary in preparing certain meats for baking, i.e. those having a layer of fat about at least a portion of the exterior, such as hams, to score the fat by parallel lines running both circumferentially about the meat and longitudinally in the direction of the bone. This provides not only a means for direct access of flavoring material to the lean portion of the meat, but also as means for decoration. The crossed lines define a plurality of aligned squares on the fat surface, and cloves, or other spices or decorating material, may be placed in the centers of the squares to enhance the appearance of the meat.

For best results, the fat layer should not be too thick, for the slits will spread too far open and the best flavor is not produced if too much fat is present. It is also important that the score marks be parallel and evenly spaced to obtain a pleasing appearance. Proper trimming and scoring have required considerable skill, and much time is required to accomplish it.

The general object of the present invention is to provide a knife which will accomplish the double task of trimming and scoring in one simple operation.

A more specific object is to provide a knife which will automatically trim off all excess fat on a ham while making a plurality of accurately spaced and parallel score lines.

Another object is the provision of a knife of this type which includes gauging means so that its cutting action will be predetermined and precise, regardless of the skill of the person using it.

A further object of the invention is to provide a trimming and scoring knife which is extremely rugged in construction, and which will be very easy to clean and maintain in a sanitary condition.

Other objects of the invention will become apparent from the following description of one practical embodiment thereof, when taken in conjunction with the drawings which accompany, and form part of, this specification.

Figure 1:
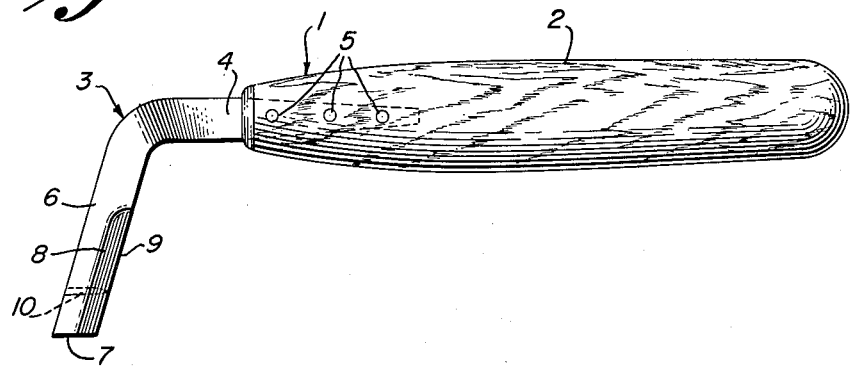
FIGURE 1 is a side elevation of a knife embodying the principles of the present invention.
Figure 2:
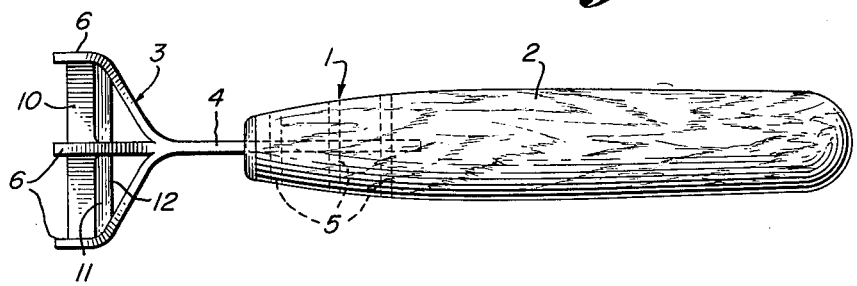
FIGURE 2 is a top plan view of the knife shown in FIGURE 1.
Figure 3:
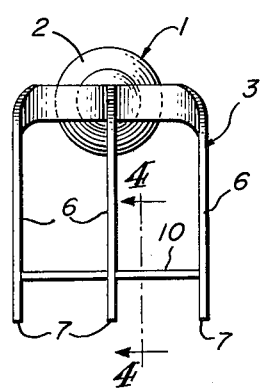
FIGURE 3 is a front view of the knife.
Figure 4:
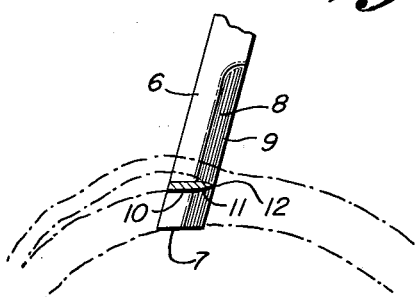
FIGURE 4 is a fragmentary section taken on the line 4—4 of FIGURE 3, showing the position of the knife relative to a ham.

In general, the invention contemplates the provision of a scoring and trimming knife having a plurality of parallel vertical scoring blades and a horizontal blade spaced from the ends of the vertical blades a predetermined distance to trim excess fat from the hams as the knife is drawn across the meat.

Referring to the drawings in detail, there is shown a knife 1 having a handle 2 and a blade head 3. The blade head has a single mounting prong 4 which projects into the handle and is secured rigidly in place by rivets 5 which extend through the handle and mounting prong.

The blade head branches laterally from the mounting prong to form three scoring blades 6. There is a center blade, which is a continuation of the mounting prong, and two side blades, equi-spaced on opposite sides of the center blade. All three blades, after their emergence from the horizontal mounting prong, turn downwardly at an obtuse angle to the prong, so that the blades lie at a slight forwardly projecting angle. The bottoms 7 of blades 6 are cut to be parallel to the mounting prong. Thus, when the blades have their bottoms resting flat upon a surface, the knife handle will lie substantially parallel to the surface. The rear edges of the blades are tapered, as at 8, and sharpened to provide cutting edges 9. The cutting edges may extend any desired distance up the blades from the bottoms.

Spaced from the bottoms of the blades a distance equal to the thickness of the desired layer of fat to remain on the ham, is a horizontal trimming blade 10. This blade spans the spaces between blades 6, and is substantially the same width as the blades 6. The trimming blade also has its rear surface bevelled, as at 11, and its back edge sharpened to provide a cutting edge 12. Blade 10 not only serves to trim the ham, as will be described, but acts as a brace to hold the scoring blades in rigid parallelism so that their cutting edges remain fixed distances apart.

When a ham is to be trimmed and scored, the knife will be pressed firmly into one side of the fat layer, cutting through the soft layer until the blunt bottom edges of the blades 6 come to rest against the firm lean meat. The knife will then be drawn across the meat, keeping the blade ends firmly in contact with the outer surface of the lean portion of the meat, so that the meat surface forms a guide plane over which the knife travels. During this movement, the handle will be held substantially parallel to the outer surface of the ham to maintain the blade bottoms flat against the lean meat. This motion will accomplish two things; it will cause the fat to be scored depthwise by the three scoring blades 6, and it will trim off excess fat by reason of the trimming blade 10 travelling at a uniform distance from the surface of the lean meat. The motion will be repeated as many times as may be required to cover the entire fat layer. Each new stroke will be made with one of the side blades in the end cut made during the previous stroke. This will insure parallelism of all of the score marks, and at the same time insure complete trimming of excess fat. When the entire surface has been scored in one direction, it is traversed a second time at rigth angles to the direction of the first cuts to form the conventional score pattern.

It will be evident that the number of blades and their arrangement can be varied as desired, and that the trimming blade can be placed at different heights for those who desire different thickness fat layers.

While in the above one practical embodiment of the invention has been disclosed, it will be understood that the precise details of structure shown and described are merely for purposes of illustration, and the invention may take other forms within the scope of the appended claims.

What is claimed is:

1. A meat trimming and scoring knife comprising, a plurality of spaced, parallel scoring blades joined together at one end and terminating at their opposite ends in blunt guide surfaces, the blades each having a corresponding edge sharpened from the blunt end a determined distance toward the joined end, a handle connected to the joined ends of the scoring blades, and a trimming blade traversing the spaces between the scoring blades and located intermediate the lengths of the sharpened edges of the scoring blades a determined distance from the scoring blade blunt ends, the trimming blade lying parallel to the scoring blade blunt ends and having a sharpened edge intersecting the sharpened edges of the scoring blades.

2. A meat trimming and scoring knife as claimed in claim 1 wherein the handle extends from the joined scoring blade ends parallel to the blunt ends of the scoring blades.

References Cited in the file of this patent

UNITED STATES PATENTS

| | | |
|---|---|---|
| 251,851 | Emmenegger | Jan. 3, 1882 |
| 466,343 | Grant | Jan. 5, 1892 |
| 827,906 | Cassady | Aug. 7, 1906 |
| 2,258,448 | Gesell | Oct. 7, 1941 |
| 2,474,425 | Jackson | June 28, 1949 |